United States Patent Office 3,247,289
Patented Apr. 19, 1966

3,247,289
POLYVINYL CHLORIDE COMPOSITION HAVING AS POLYMERIZABLE PLASTICIZER A MIXTURE OF ALKYLENE DIMETHACRYLATE AND AN ALKYL METHACRYLATE OF 6 TO 18 CARBON ATOMS
James K. Sears, Webster Groves, Mo., assignor to Monsanto Company, a corporation of Delaware
No Drawing. Filed Sept. 14, 1961, Ser. No. 137,986
14 Claims. (Cl. 260—884)

This invention relates to new and useful compositions comprising halogen-containing vinyl resins. More particularly this invention is concerned with compositions comprising halogen-containing vinyl resins and a plasticizer, the latter comprising an alkylene dimethacrylate and an alkyl methacrylate. The invention has special utility with respect to the production of halogen-containing vinyl resin plastisols, organosols, and dry blends wherein the alkylene dimethacrylate-alkyl methacrylate plasticizer functions effectively as a polymerizable plasticizer which in turn yields a plasticized resinous composition characterized by a permanence of plasticization.

Normally, vinyl halide polymers such as polyvinyl chloride and copolymers thereof, which are widely employed in the plastics industry, are quite hard and brittle in nature and require the addtion of substantial proportions of a plasticizer to improve their workability. It is desirable to use a plasticizer which does not permit the product to become hard and brittle and thus easily fractured. It is especially desirable to use a plasticizer which will impart essentially permanent semi-rigid properties to the polymer composition, thereby eliminating the probability of the plasticizer being extracted and leaving the product brittle again.

It is an object of this invention to provide improved halogen-containing vinyl resin compositions.

A further object is to provide novel compositions comprising halogen-containing resins and certain mixtures of alkylene dimethacrylates and alkyl methacrylates.

A still further object of this invention is to provide new polymerizable plasticizer compositions for vinyl halide polymers and copolymers.

Another object is to provide new resin compositions which may be prepared by conventional formulation methods and which, upon fusion and curing, result in a material with permanent semi-rigid properties.

Other objects and advantages of this invention will become apparent from the following description of the invention.

In accordance with this invention, it has been found that a plastisol comprising a halogen-containing vinyl resin and a polymerizable plasticizer, the latter comprising an alkylene dimethacrylate and an alkyl methacrylate, may be fused and cured to a semi-rigid material whose physical properties are esesntially permanent. The aforementioned plastisols are prepared in a well-known manner by intimately mixing or stirring a finely divided resin with a novel polymerizable plasticizer, preferably in conjunction with a small amount of a peroxy polymerization catalyst, until a smooth dispersion is obtained. This composition, upon molding and curing, results in a flexible material exhibiting essentially permanent physical properties.

The halogen-containing resins of this invention are those derived from such vinyl compounds as vinyl chloride, vinyl chloroacetate, chlorostyrene, chlorobutadienes, etc. Said resins also include the copolymers of such vinyl compounds and other ethylenically unsaturated monomers copolymerizable therewith. Illustrative are the copolymers of a vinyl halide such as vinyl chloride with such materials as vinylidene chloride; vinyl esters of carboxylic acids, e.g. vinyl acetate, vinyl propionate, vinyl butyrate, vinyl benzoate; esters of unsaturated acids, e.g. alkyl acrylates such as methyl acrylate, ethyl acrylate, propyl acrylate, butyl acrylate, allyl acrylate, and the corresponding esters of methacrylic acid; vinyl aromatic compounds, e.g. styrene, ortho-chlorostyrene, para-chlorostyrene, 2,5-dichlorostyrene, 2,4-dichlorostyrene, para-ethyl styrene, vinyl naphthalene, α-methyl styrene; dienes such as butadiene, chlorobutadiene; unsaturated amides such as acrylic acid amide, acrylic acid anilide; unsaturated nitriles such as acrylic acid nitrile; esters of α,β-unsaturated carboxylic acids, e.g. the methyl, ethyl, propyl, butyl, amyl, hexyl, heptyl, octyl, allyl, methallyl and phenyl esters of maleic, crotonic, itaconic and fumaric acids and the like.

It should be recognized that halogenated resins containing halogen atoms other than chlorine e.g. bromine, fluorine and iodine, are also operable in this invention. Said resins may contain varying proportions of halogen depending upon the nature of the resin and its contemplated use.

Those copolymers in which a predominant portion, i.e., at least 50% by weight of the copolymer is made from a halogen-containing vinyl compound such as vinyl chloride represent a preferred class of polymers to be treated according to this invention.

The above halogen-containing vinyl resins are of the dispersion type, and their preparation is well-known in the art. They are usually prepared by a conventional aqueous emulsion polymerization which produces a latex-like dispersion of the halogen-containing resin. The polymeric material is recovered from the latex-like dispersion by a coagulation or flocculation process as a fine powder wherein usually 95% of the particles are within ±0.05 micron of the mean particle size. Halogen-containing dispersion type resins having a wide range of average particle size, as for example, from about 0.05 to about 200 microns, can be employed in practicing this invention. However, the use of powdery halogen-containing resins having an average particle size of from 0.05 to about 30 microns is preferred. Powdery dispersion type resins having a particle size less than 0.05 micron may tend to dissolve too readily in the plasticizer and cause the plastisol to gel. Powdery dispersion resins having an average particle size greater than about 30 microns may tend to form grainy plastisols.

The alkylene dimethacrylates useful in the compositions of this invention are the monomeric dimethacrylate esters of alkylene glycols or mixtures thereof. The alkylene dimethacrylates may have a molecular weight up to 600. Preferably, the alkylene dimethacrylates used in this invention have a molecular weight from about 190 to about 350.

These alkylene dimethacrylate esters can be prepared by esterification of methacrylic acid with a suitable glycol or a mixture of glycols by methods known to the art, as for example, esterification of methacrylic acid with dipropylene glycol to obtain dipropylene glycol dimethacrylate.

Illustrative of the glycols which can be used in the practice of this invention are alkylene glycols, as for example, ethylene glycol, 1,2-propanediol, 1,3-propanediol, 2-methyl-2-ethyl-1,3-propanediol, 1,2-butanediol, 1,3-butanediol, 1,4-butanediol, 2-butene-1,4-diol, 2,3-butanediol, 2,2-dimethylpropane-1,3-diol, 1,4-pentanediol, 1,5-pentanediol, 1,6-hexanediol, 2-methyl- 2,4-pentanediol, 2,3-dimethyl-2,3-butanediol, 2,2-diethyl- 1,3-propanediol, 1,10-decanediol, 1,12-octadecanediol, 9,10-octadecanediol, and the like; polyalkylene glycols such as diethylene glycol, triethylene glycol, tetraethylene glycol, pentaethylene glycol, hexaethylene glycol, dipropylene glycol, tripropylene glycol and the like.

The term "alkyl methacrylate" as used herein is meant to include monomers of alkyl methacrylates in which the alkyl group contains from six to eighteen carbon atoms. As illustrative of the alkyl methacrylates contemplated by this invention are hexyl methacrylate, sec.-hexyl methacrylate, 2,2-dimethyl-3-butyl methacrylate, 2,2-dimethyl-4-butyl methacrylate, 2,3-dimethyl-2-butyl methacrylate, 2-methyl-1-penytl methacrylate, 2-methyl-2-pentyl methacrylate, 3-methyl-1-phenyl methacrylate, etc., heptyl methacrylate, sec.-heptyl methacrylate, 2,3-dimethyl-3-pentyl methacrylate, 2,4 - dimethyl-2-pentyl methacrylate, 2,4-dimethyl-3-pentyl methacrylate, 2,2,3-trimethyl-3-butyl methacrylate, 3-ethyl-2-pentyl methacrylate, 2-methyl-2-hexyl methacrylate, octyl methacrylate, 2-ethylhexyl methacrylate, nonyl methacrylate, decyl methacrylate, lauryl methacrylate, myristyl methacrylate, cetyl methacrylate, stearyl methacrylate and the like. Alkyl methacrylates in which the alkyl groups contain from twelve to eighteen carbon atoms represent an especially preferred class of methacrylates to be used in this invention.

The alkyl methacrylates and methods for their preparation are well-known to the art. The alkyl methacrylates are usually prepared by the alcoholysis of methyl methacrylate.

Generally speaking, about 10 to 400 parts by weight of a plasticizer mixture, as hereinafter described, can be used for each 100 parts by weight of resin. However, it is particularly preferred to use from about 30 to 80 parts by weight of plasticizer per 100 parts by weight of resin.

Each 100 parts by weight of said plasticizer can be comprised of from about 10 to about 90 parts by weight of an alkylene dimethacrylate and from about 10 to about 90 parts by weight of an alkyl methacrylate wherein the ratio of alkylene dimethacrylate to alkyl methacrylate is at least about 1:10. In preferred formulations, each 100 parts by weight of the plasticizer comprises from about 50 to about 80 parts by weight of alkylene dimethacrylate and from about 20 to about 50 parts by weight of an alkyl methacrylate wherein the ratio of the alkylene dimethacrylate to the alkyl methacrylate is at least about 1:1.

For many purposes it may be desirable to blend other conventional additives with the plasticized vinyl halide polymer compositions of the present invention. Illustrative of such additives are fillers, dyes, pigments, stabilizers, lubricants, and the like, and it will be apparent that compositions containing such other additives are within the scope of this invention.

A particularly valuable property of the plasticized vinyl halide compositions which are prepared in accordance with the present invention is the permanence of plasticization. As a result of such permanence the compositions of this invention tend to remain free from embrittlement with the passage of time. The use of such polymerizable plasticizers eliminates necessity of maintaining the wide tolerance in physical dimensions of castings and moldings which are required when non-polymerizing plasticizers are employed.

According to the present invention, novel resinous compositions are prepared by stirring together, in the weight proportions set forth below, a dispersion type halogen-containing resin, an alkylene dimethacrylate and an alkyl methacrylate. From the resulting composition films or shaped articles are formed by casting, molding, extruding, calendaring, coating or by other known methods. Such films or articles are then converted to the cured state by heating at from about 150° C. to about 170° C. for about 5 to about 25 minutes. The cured material is cooled to room temperature.

In order to facilitate the curing of the polymerizable plasticizer in the resin dispersion within a practicable time period, it is preferred to incorporate from 0.5% to about 5% by weight of a polymerization catalyst, based on the weight of the polymerizable plasticizer. While any of the peroxy polymerization catalysts such as benzoyl peroxide, acetyl peroxide, succinyl peroxide, methyl ethyl ketone peroxide, cumene hydroperoxide, tertiary-butyl hydroperoxide, perbenzoic acid, peracetic acid, anisoyl peroxide, tolyl peroxide, p-bromobenzoyl peroxide, furoyl peroxide, chloracetyl peroxide are effective, it is preferred to use t-butyl perbenzoate or benzoyl peroxide. Other catalysts well adapted for use in this invention include the aliphatic azo catalysts such as alpha, alpha' azo-diisobutyronitrile and alpha, alpha' azo-bis-alpha, gamma-dimethyl valeronitrile.

The invention will be more fully understood by reference to the following examples. These examples, however, are given for the purpose of illustration only and are not to be construed as limiting the scope of the present invention in any way.

Resinous compositions are prepared by stirring together, in the weight proportions set forth in Table I, a dispersion type polyvinyl chloride resin and the plasticizer. The properties of the resulting compositions after fusion are given in Table II.

*Table I*

| | Parts by weight | | | | | | | | | | | | | | | | | | | | | | | | |
|---|---|---|---|---|---|---|---|---|---|---|---|---|---|---|---|---|---|---|---|---|---|---|---|---|---|
| | A | B | C | D | E | F | G | H | I | J | K | L | M | N | O | P | Q | R | S | T | U | V | W | X | Y |
| Diethylene glycol dimethacrylate | 50 | 60 | 70 | 80 | 90 | 50 | 60 | 70 | 80 | 90 | 50 | 60 | 70 | 80 | 90 | 50 | 60 | 70 | 80 | 90 | 50 | 60 | 70 | 80 | 90 |
| Lauryl methacrylate | 50 | 40 | 30 | 20 | 10 | 50 | 40 | 30 | 20 | 10 | 50 | 40 | 30 | 20 | 10 | | | | | | | | | | |
| Stearyl methacrylate | | | | | | | | | | | | | | | | 50 | 40 | 30 | 20 | 10 | 50 | 40 | 30 | 20 | 10 |
| Polyvinyl chloride | 233 | 233 | 233 | 233 | 233 | 150 | 150 | 150 | 150 | 150 | 25 | 25 | 25 | 25 | 25 | 233 | 233 | 233 | 233 | 233 | 150 | 150 | 150 | 150 | 150 |

*Table II*

| | A | B | C | D | E | F | G | H | I | J | K | L | M | N | O | P | Q | R | S | T | U | V | W | X | Y |
|---|---|---|---|---|---|---|---|---|---|---|---|---|---|---|---|---|---|---|---|---|---|---|---|---|---|
| Elongation, percent | 26 | 16 | 10 | 8 | 6 | 22 | 16 | 10 | 8 | 6 | 18 | 16 | 10 | 8 | 6 | 36 | 56 | 58 | 30 | 6 | 26 | 38 | 18 | 10 | 6 |
| Yield point, 1,000 p.s.i. | 4.5 | 5.5 | 6.0 | 6.5 | 6.75 | 2.7 | 4.25 | 5.0 | 5.75 | 6.5 | 0 | 1.8 | 3.25 | 4.0 | 4.6 | 3.0 | 3.4 | 4.0 | 4.5 | 5.0 | 2.8 | 3.4 | 4.4 | 5.9 | 7.0 |

NOTE.—The tensile properties set forth above were determined on dumbell specimens having the neck 0.475 inch long and 0.118 inch wide using an Instron tensile tester model TTC.

As illustrative of the prior art, compositions and physical properties of cured resins prepared with a plasticizer mixture consisting of a non-polymerizable plasticizer and an alkylene dimethacrylate, are shown in Tables III and IV.

Further examples of compositions of this invention exhibiting similar results as obtained by the use of compositions of Table I are shown in Table V.

Table V

| | Parts by weight | | | | | | | | | | | | | | |
|---|---|---|---|---|---|---|---|---|---|---|---|---|---|---|---|
| | AA | BB | CC | DD | EE | FF | GG | HH | II | JJ | KK | LL | MM | NN | OO |
| Dipropylene glycol dimethacrylate | 60 | 70 | 70 | | | | | | | 50 | 70 | | | | |
| 1,4-butanediol dimethacrylate | | | | 60 | 70 | 70 | | | | | | 50 | 70 | 50 | 70 |
| 1,6-hexanediol dimethacrylate | | | | | | | 60 | 70 | 70 | | | | | | |
| Lauryl methacrylate | 40 | | 30 | 40 | | 30 | 40 | | 30 | 50 | | 50 | | | 30 |
| Stearyl methacrylate | | 30 | | | 30 | | | 30 | | | 30 | | 30 | 50 | |
| Polyvinyl chloride | 150 | | | | 150 | | 150 | | | 233 | | | 233 | 233 | |
| Copolymer of 90 parts vinyl chloride and 10 parts vinyl acetate | | 150 | | | | | | 150 | | | 233 | | | | |
| Copolymer of 90 parts vinyl chloride and 10 parts vinylidene chloride | | | 150 | | 150 | | | | | | | 233 | | | |
| Copolymer of 90 parts vinyl chloride and 10 parts diethyl maleate | | | | 150 | | | | 150 | | | | | | | 233 |

Table III

| | Parts by weight | | | | |
|---|---|---|---|---|---|
| | 1 | 2 | 3 | 4 | 5 |
| Diethylene glycol dimethacrylate | 50 | 60 | 70 | 80 | 90 |
| Di-2-ethylhexyl phthalate | 50 | 40 | 30 | 20 | 10 |
| Polyvinyl chloride | 150 | 150 | 150 | 150 | 150 |

Table IV

| | 1 | 2 | 3 | 4 | 5 |
|---|---|---|---|---|---|
| Elongation, percent | 160 | 117 | 80 | 28 | 8 |
| Yield point, 1,000 p.s.i | 1.0 | 1.8 | 4.4 | 7.0 | 7.7 |

NOTE.—The tensile properties set forth above were determined on dumbell specimens having the neck 0.475 inches long and 0.118 inches wide using an Instron tensile tester model TTC.

Compositions F, G, H, I, J, U, V, W, X, and Y (Tables I and II) containing polymerizable plasticizer mixtures of this invention show small variance in elongation and tensile strength. In comparison, wide variance of such properties are obtained with compositions 1, 2, 3, 4 and 5 (Tables III and IV) wherein a conventional non-polymerizable plasticizer is part of the plasticizer mixture.

From the foregoing results it is evident that the compositions of this invention have improved physical properties over compositions prepared with a conventional plasticizer. The results also indicate that variations in the percentage of plasticizer in the compositions of this invention are not as critical as are similar variations when using conventional nonpolymerizable plasticizers as shown in Tables III and IV. Similar physical properties are obtained in the compositions of this invention, even over a wide range of plasticizer concentrations, whereas compositions containing conventional plasticizers exhibit a shift in physical properties with small changes in the plasticizer concentration.

Although this invention is directed primarily to plastisol compositions, it is equally applicable to organosol and dry blend formulations.

A typical organosol composition of this invention consists of 280 parts by weight of polyvinyl chloride, 95 parts by weight of diethylene glycol dimethacrylate, 23 parts by weight of lauryl methacrylate and 2 parts by weight of hexane.

Exemplary of a dry blend formulation is 60 parts by weight of polyvinyl chloride, 24 parts by weight of diethylene glycol dimethacrylate, and 16 parts by weight of lauryl methacrylate.

While this invention has been described with respect to certain embodiments, it is not so limited and it is to be understood that variations and modifications thereof may be made which are obvious to those skilled in the art without departing from the spirit or scope of this invention.

The embodiments of the invention in which an exclusive property or privilege is claimed are defined as follows:

1. A composition consisting essentially of (a) a polymer of vinyl halide selected from the group consisting of homopolymers of vinyl halide and copolymers of vinyl halide containing at least 50% vinyl halide and up to 50% of an ethylenically unsaturated monomer copolymerizable therewith, (b) an alkylene dimethacrylate having a molecular weight up to about 600, and (c) an alkyl methacrylate in which the alkyl radical contains from 6 to 18 carbon atoms.

2. A composition as defined in claim 1 consisting essentially of from about 10 to about 400 parts by weight of a mixture of (b) and (c) per 100 parts by weight of (a) and wherein the weight ratio of (b):(c) is at least about 1:10.

3. A composition as defined in claim 1 consisting essentially of from about 30 to about 80 parts by weight of a mixture of (b) and (c) per 100 parts by weight of (a) and wherein the weight ratio of (b):(c) is at least about 1:1.

4. A composition as defined in claim 2 wherein the vinyl halide polymer is a homopolymer.

5. A composition as defined in claim 2 wherein the vinyl halide polymer is a vinyl chloride polymer containing at least 50% vinyl chloride.

6. A composition as defined in claim 2 wherein the vinyl halide polymer is a copolymer of vinyl chloride and vinyl acetate.

7. A composition consisting essentially of (a) polymerized vinyl chloride, (b) an alkylene dimethacrylate having a molecular weight from about 190 to about 350 and (c) an alkyl methacrylate in which the alkyl radical contains from 12 to 18 carbon atoms.

8. A composition as defined in claim 7 consisting essentially of from about 10 to about 400 parts by weight of a mixture of (b) and (c) per 100 parts by weight of (a) and wherein the weight ratio of (b):(c) is at least about 1:10.

9. A composition as defined in claim 8 wherein the alkylene dimethacrylate is diethylene glycol dimethacrylate.

10. A composition as defined in claim 8 wherein the alkyl methacrylate is lauryl methacrylate.

11. A composition as defined in claim 8 wherein the alkyl methacrylate is stearyl methacrylate.

12. A composition as defined in claim 8 wherein the alkylene dimethacrylate is dipropylene glycol dimethacrylate.

13. A composition as defined in claim 7 consisting essentially of from about 30 to about 80 parts by weight of a mixture of (b) and (c) per 100 parts by weight of (a) and wherein the weight ratio of (b):(c) is at least about 1:1.

14. A composition consisting essentially of from about 30 to about 80 parts by weight of a mixture of diethylene glycol dimethacrylate and lauryl methacrylate per 100 parts by weight of polymerized vinyl chloride and wherein the weight ratio of diethylene glycol dimethacrylate to lauryl methacrylate is at least about 1:1.

References Cited by the Examiner

UNITED STATES PATENTS

| | | | |
|---|---|---|---|
| 2,101,107 | 12/1937 | Strain | 260—89.5 |
| 2,516,064 | 7/1950 | Marks | 260—89.5 |
| 2,611,195 | 9/1952 | Brophy et al. | 260—891 |
| 2,618,621 | 11/1952 | Burt | 260—884 |
| 2,889,582 | 6/1959 | Cooper | 260—884 |
| 3,157,713 | 6/1961 | Leese | 260—884 |

SAMUEL H. BLECH, *Primary Examiner.*

LEON J. BERCOVITZ, MURRAY TILLMAN,
*Examiners.*